United States Patent

Robertson et al.

[11] Patent Number: 5,857,042
[45] Date of Patent: Jan. 5, 1999

[54] OPTICAL INTERCONNECTION ARRANGEMENTS

[75] Inventors: Brian Robertson, Montreal; Frank A. P. Tooley, Mount Royal, both of Canada

[73] Assignee: McGill University, Montreal, Canada

[21] Appl. No.: 848,287

[22] Filed: Apr. 29, 1997

[51] Int. Cl.$^6$ ...................................................... G02B 6/32
[52] U.S. Cl. ................................ 385/33; 359/455; 385/93
[58] Field of Search ................................... 385/33, 13 K, 385/35, 36, 37, 93; 359/454, 455, 432, 621, 622, 558

[56] References Cited

U.S. PATENT DOCUMENTS

| | | | |
|---|---|---|---|
| 4,165,154 | 8/1979 | Takahashi | 359/455 |
| 5,386,252 | 1/1995 | Oku | 348/746 |
| 5,412,506 | 5/1995 | Feldblum et al. | 359/569 |
| 5,629,765 | 5/1997 | Schmutz | 356/121 |
| 5,731,899 | 3/1998 | Meyers | 359/621 |

*Primary Examiner*—Rodney Bovernick
*Assistant Examiner*—Ellen E. Kang
*Attorney, Agent, or Firm*—Lane, Aitken & McCann

[57] ABSTRACT

An optical interconnection arrangement comprises a plurality of substantially parallel optical interconnection channels. In each channel, there are an optical source, an optical receiver, a first lens and a second lens. The first lens conveys light from the source to the second lens, and the second lens refocusses the light at the receiver. Each source and the associated first lens are offset one relative to the other by a predetermined distance in a direction transverse to an optical axis of the first lens. The corresponding receiver and the associated second lens are offset one relative to the other by the same distance but in the opposite direction to the offset between the source and first lens. Each offset is equal and opposite to the corresponding offset in an adjacent channel. With such an arrangement, if a leakage portion of a light beam from a first lens in one channel impinges upon the second lens in an adjacent channel, the leakage portion will be refocussed at a position which is spaced from the receiver of such adjacent channel. In one embodiment, in each channel, the first lens and the second lens share a common optical axis and the source and receiver are offset relative to such common optical axis. In an alternative embodiment, the source and the receiver share a common optical axis and the first lens and the second lens are offset relative to such common optical axis. Such optical interconnection arrangements are tolerant of translational or rotational misalignments between the sources and associated first lenses on the one hand and the receivers and associated second lenses on the other hand, which is of particular advantage for free space optical interconnects or couplers.

11 Claims, 7 Drawing Sheets

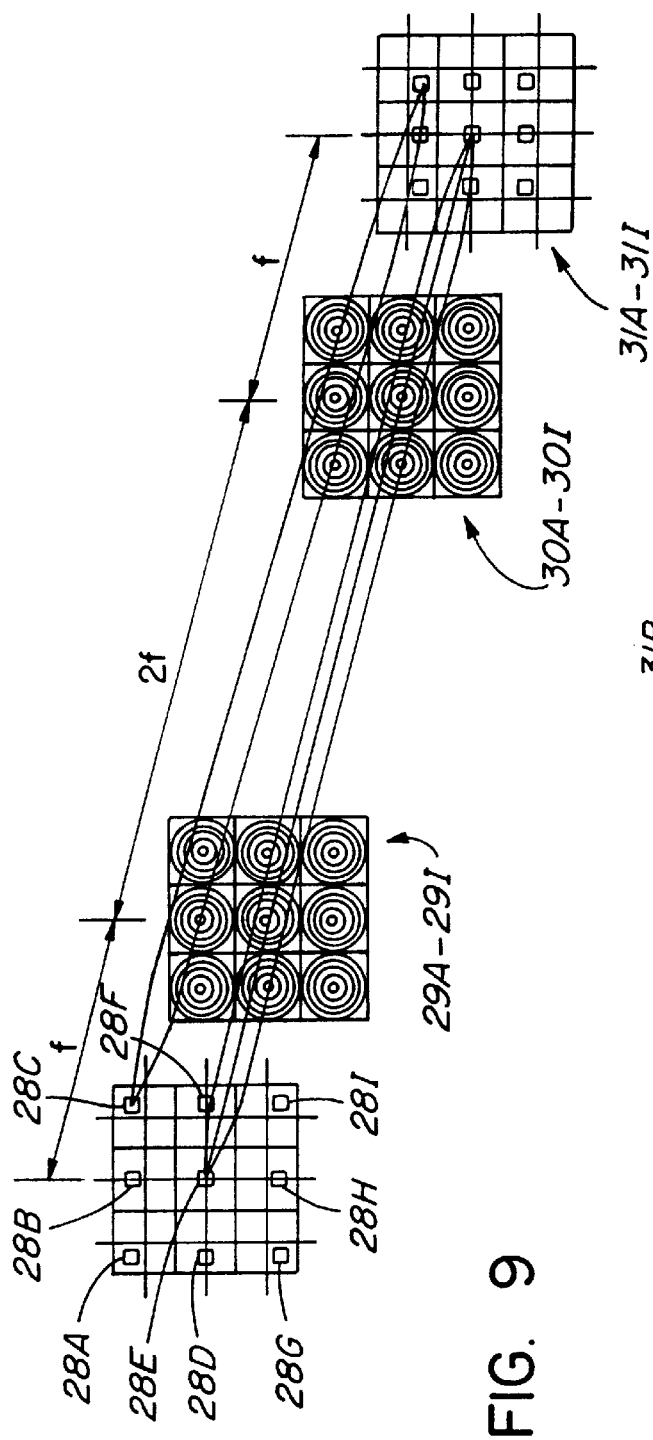
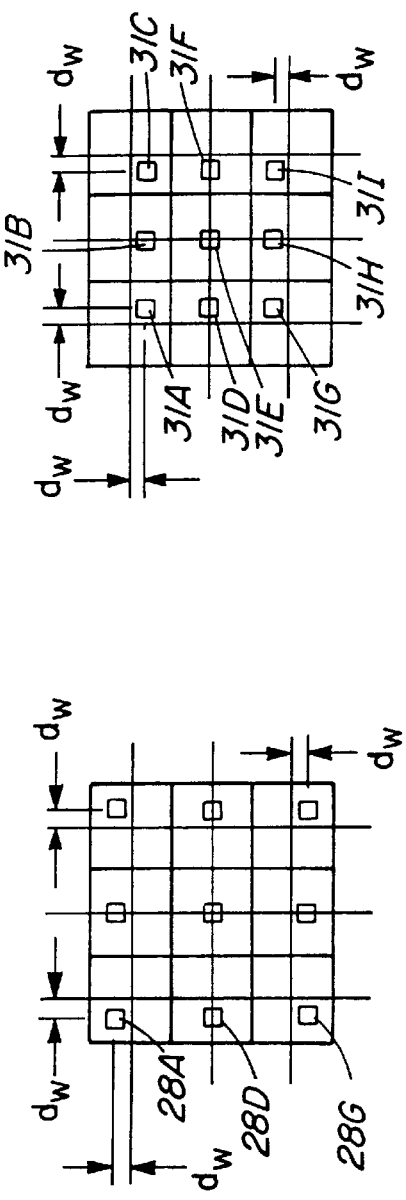
FIG. 9
FIG. 10A
FIG. 10B

OPTICAL INTERCONNECTION ARRANGEMENTS

BACKGROUND OF THE INVENTION

1. Technical Field

This invention relates to optical interconnection arrangements for coupling a plurality of optical sources or emitters with a plurality of optical receivers and is especially applicable to so-called "microchannel relays".

2. Background Art

Microchannel relays may be used for a variety of purposes, including free-space optical interconnects (e.g. for communication from one printed circuit board to another, optical backplanes, digital and analog optical computing systems and optical data storage); emitter array-to-fibre ribbon/array couplers, and fibre ribbon/array-to-receiver couplers; and fiber ribbon/array-to-fiber ribbon/array couplers.

A typical microchannel relay comprises a plurality of parallel channels, each comprising a source, a receiver and a pair of lenses or lenslets. One lens collimates light from the adjacent source and the other lens collects the collimated light from the first lens and refocusses it at the adjacent receiver.

In most applications, the parallel microchannel relay channels, perhaps one thousand or more, must be provided in a very small space. A problem encountered with such high-density free-space microchannel relay systems is that their performance is very sensitive to misalignment of the lenses relative to each other and/or to the sources or receivers. In order to ensure maximum optical efficiency, it is desirable for the lenses to be as large as possible and adjacent lenslets in each array to be contiguous. Consequently, even small translational or rotational misalignments can reduce throughput significantly and increase the level of optical crosstalk between neighbouring optical communication channels. Although this problem can be ameliorated by using precision optomechanics, a disadvantage of doing so is a significant increase in cost.

SUMMARY OF THE INVENTION

An object of the present invention is to mitigate the afore-mentioned problem and provide an optical interconnect that is tolerant of misalignment yet relatively inexpensive. To this end, in optical interconnection arrangements according to the present invention each source and lens combination is not symmetrical with its corresponding receiver and lens combination.

According to the present invention, an optical interconnection arrangement comprises:

a plurality of substantially parallel optical channels each comprising a set of optical components including an optical source, an optical receiver, first lens means and second lens means, the first lens means being arranged for conveying light from the source to the second lens means, and the second lens means for refocussing the light at the receiver, wherein the components in each of said channels are configured such that an axis of a chief light ray conveyed between the first lens means and second lens means of one channel is not parallel to an axis of a chief light ray conveyed between the first lens means and second lens means of an immediately neighbouring channel, such that, if a leakage portion of a light beam from a said first lens means in the one channel impinges upon said second lens means in the neighbouring channel, such leakage portion will be refocussed at a position spaced from the receiver of said adjacent channel.

Each source and the associated first lens means may be offset one relative to the other by a predetermined distance in a direction transverse to an optical axis of the first lens means. The corresponding receiver and the associated second lens means will then be offset one relative to the other by the same predetermined distance but in the opposite direction. Each offset in the one channel is equal and opposite to the corresponding offset in the immediately neighbouring channel.

The plurality of first lens means may be spaced apart in a regular manner, and the second lens means may be laid out in register with them so that, in each channel, the first lens means and second lens means share a common optical axis. The sources and receivers would then be offset relative to such common optical axes. Alternatively, the sources and receivers may be laid out in a regular manner, each source in register with the associated receiver along a common optical axis, and the first lens means and second lens means be offset relative to such common optical axes.

The sources, receivers, first lens means and second lens means may be arranged in respective two-dimensional arrays. The sources and receivers may be grouped into clusters within a larger array.

Various objects, features, aspects and advantages of the present invention will become more apparent from the following detailed description, taken in conjunction with the accompanying drawings, of preferred embodiments of the invention, which are described by way of example only.

BRIEF DESCRIPTION OF THE DRAWINGS

FIG. 9 is a schematic diagram of a fourth embodiment of the invention using two-dimensional arrays;

FIGS. 10A and 10B illustrate offsets of optical elements of the two-dimensional microchannel relay of FIG. 9.

DESCRIPTION OF THE PREFERRED EMBODIMENTS

Figure 1:
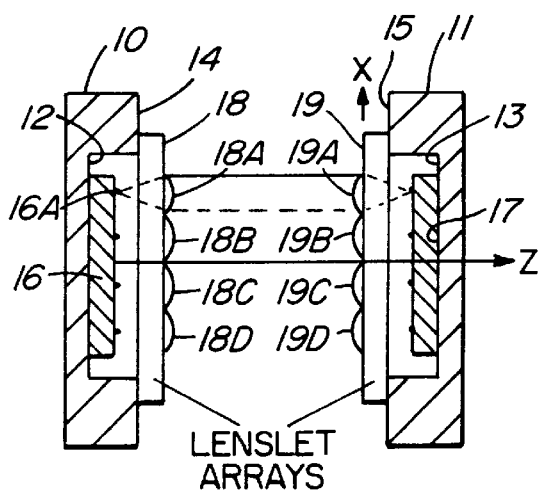
FIG. 1, labelled PRIOR ART, is a schematic diagram of a microchannel relay comprising two lenslet arrays.
Figure 2:
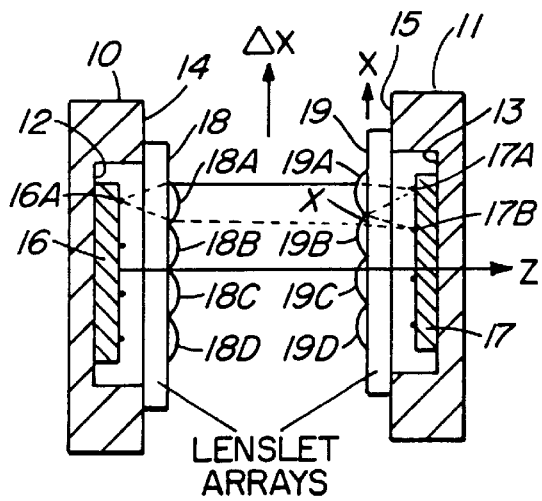
FIG. 2, also labelled PRIOR ART, illustrates the effect of translational misalignment of the lenslet arrays of the relay of FIG. 1.

Referring to FIGS. 1 and 2, a known microchannel relay comprises two integrated circuit carriers 10 and 11 having recesses 12 and 13 in their respective juxtaposed, spaced-apart surfaces 14 and 15. Recesses 12 and 13 house integrated circuits 16 and 17, respectively. Lenslet units 18 and 19 extend across the mouths of recesses 12 and 13, respectively. Lenslet unit 18 comprises four lenslets 18A, 18B, 18C and 18D whose focal points register with four emitters 16A, 16B, 16C and 16D, respectively, provided on the opposed surface of integrated circuit 16. Likewise, lenslet unit 19 comprises four lenslets 19A, 19B, 19C and 19D whose focal points register with four receivers 17A, 17B, 17C and 17D provided on the opposed surface of integrated circuit 17. The emitters 16A–16D might comprise lasers and the receivers 17A–17D might comprise PIN diodes.

Collimation of the light passing between each pair of lenslets allows them to be spaced apart by a significant distance. Consequently, the carriers 10 and 11 might be on, or part of, separate printed circuit cards. The spacing between the lenslet units 10 and 11 then might be about 25 mm. and the focal length of each lenslet about 12.5 mm. The pitch of lenslets 18A–18D, and lenslets 19A–19D, is equal to the lenslet width, so the lenslets in each row are contiguous.

The microchannel relay thus comprises four telecentric channels, A,B,C and D, each combination of an emitter 16, receiver 17, and intervening pair of lenslets 18,19 constituting one channel.

When the emitters, lenslets and receivers are correctly aligned, with the respective optical axes of each pair of lenslets coincident, as shown in FIG. 1, light from each of the emitters 16A–16D is transmitted by the associated one of lenslets 18A–18D as a collimated beam to the corresponding one of lenslets 19A to 19D and there is negligible "crosstalk", i.e. a portion of the light destined for one receiver being received instead by an adjacent receiver.

Although, for clarity, the drawings show only four channels, in practice, a microchannel relay usually will have many parallel channels, perhaps 1000 or more, provided in a very small space. Consequently, even though precise mechanical construction is used, there will usually be some slight translational or rotational misalignment, either between the optoelectronic devices (emitters/receivers) and the associated lenslets, or between the two arrays of lenslets. It is assumed that the sources are accurately pre-aligned with respect to their lenslets during the packaging stage; likewise for the receivers and their lenslets. The misalignment of concern is with respect to these two pre-aligned units.

FIG. 2 illustrates the effect of carrier 11 and lenslet array 19 being offset translationally relative to carrier 10 and lenslet array 18 by a distance Δx in the common plane of the respective optical axes of the lenslets. Hence, the optical axes of lenslets 18A–18D are still parallel to the optical axes of lenslets 19A–19D, but no longer coincident.

Most of the light emitted by emitter 16A, and transmitted by lenslet 18A, still impinges upon corresponding lenslet 19A and is refocussed to the correct receiver 17A. Some of the light, however, now impinges upon adjacent lenslet 18B. This leakage light, identified by the reference letter X, is refocussed to receiver 18B, resulting in optical crosstalk between channel A and channel B. Although not depicted in FIG. 2, similar crosstalk will occur between channels B and C and between channels C and D. The corresponding "leaked" light from channel D will not couple to an adjacent channel but will simply be lost. The present invention is concerned with reducing the crosstalk caused by light destined for one receiver being received instead by a neighbouring receiver.

A first embodiment of the invention will now be described with reference to FIG. 3. The individual components of the telecentric microchannel relay illustrated schematically in FIG. 3 are the same as those of the microchannel relay of FIGS. 1 and 2 and so have the same reference numbers.

Figure 3:
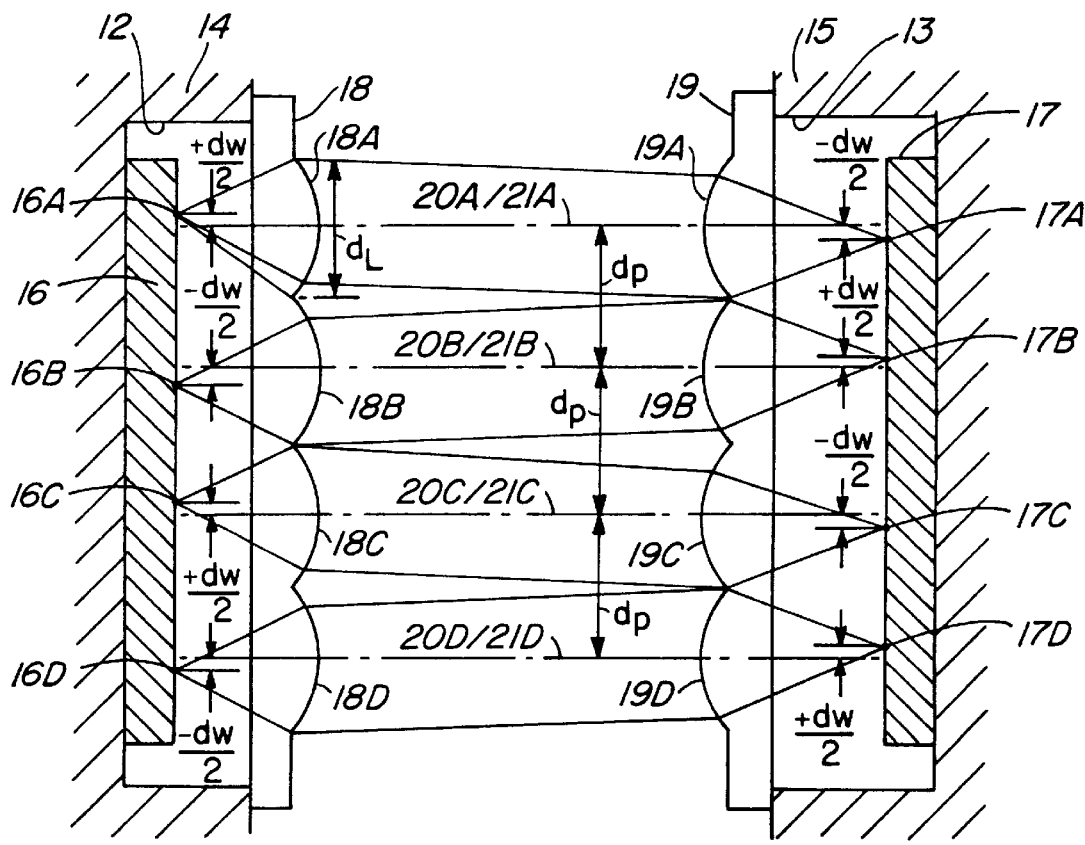
FIG. 3 is a cross-sectional partial view of a first embodiment of the present invention, namely a microchannel relay comprising two lenslet arrays mutually offset translationally a predetermined distance.

In the microchannel relay shown in FIG. 3, the lenslet units 18 and 19 are mounted, as before, with the optical axes 20A, 20B, 20C and 20D of the lenslets 18A, 18B, 18C and 18D, respectively, coincident with the optical axes 21A, 21B, 21C and 21D of lenslets 19A, 19B, 19C and 19D, respectively—assuming optimal alignment. The emitters 16A–16D and the receivers 17A–17D, however, are each offset relative to the optical axis of the adjacent lenslet. The offsets of adjacent elements are in opposite directions. The pitch $d_p$ between lenslets is equal to the lenslet aperture $d_L$.

For convenience, the directions "upwards" and "downwards" will be used to specify relative positions of the components as they are shown in the drawings, it being appreciated that the relays are not limited to use in any particular orientation. Also, in FIG. 3, offsets upwards are depicted as positive and offsets downwards are depicted as negative. Thus, in channel A, emitter 16A is offset upwards by a distance +dw/2 relative to optical axes 20A and 21A and the associated receiver 17A is offset downwards by an equivalent distance –dw/2. In channel B, however, emitter 16B is offset downwards by –dw/2 relative to optical axes 20B and 21B and receiver 17B is offset upwards by +dw/2. Emitter 16C is offset upwards by +dw/2 relative to optical axes 20C and 21C and receiver 17C offset downwards by –dw/2 relative to optical axes 20C and 21C. Finally, receiver 16D is offset downwards by –dw/2 and receiver 17D offset upwards by +dw/2. The dimension dw is the "window" size of each source or receiver, which is equal to the radius of the light beam so as to use the whole area.

The paths taken by the light beams are as shown in FIG. 3. Light beams from emitters 16A–16D still leave the corresponding lenslets 18A–18D as collimated beams. Because the emitters 16A–16D are offset, however, the beams are no longer parallel to the optical axes 20A–20D and 21A–21D. Rather, the light beams in adjacent channels A and B, respectively, converge towards the receivers, as do the light beams in adjacent channels C and D, while the light beams in adjacent channels B and C diverge. Because each of the receivers 17A to 17D and the corresponding one of the emitters 16A–16D are offset by an equal and opposite distance relative to the optical axes 20A–20D, light leaving each of the emitters 16A–16D is received by the corresponding one of receivers 17A–17D. It will be seen from FIG. 3 that there is a reduction in the amount of light traversing each of channels A–D, because the whole aperture of each lenslet is not used. Nevertheless, the reduction is acceptable because the offsetting results in a significant reduction in the level of crosstalk, between channels, caused by misalignment.

Figure 4:
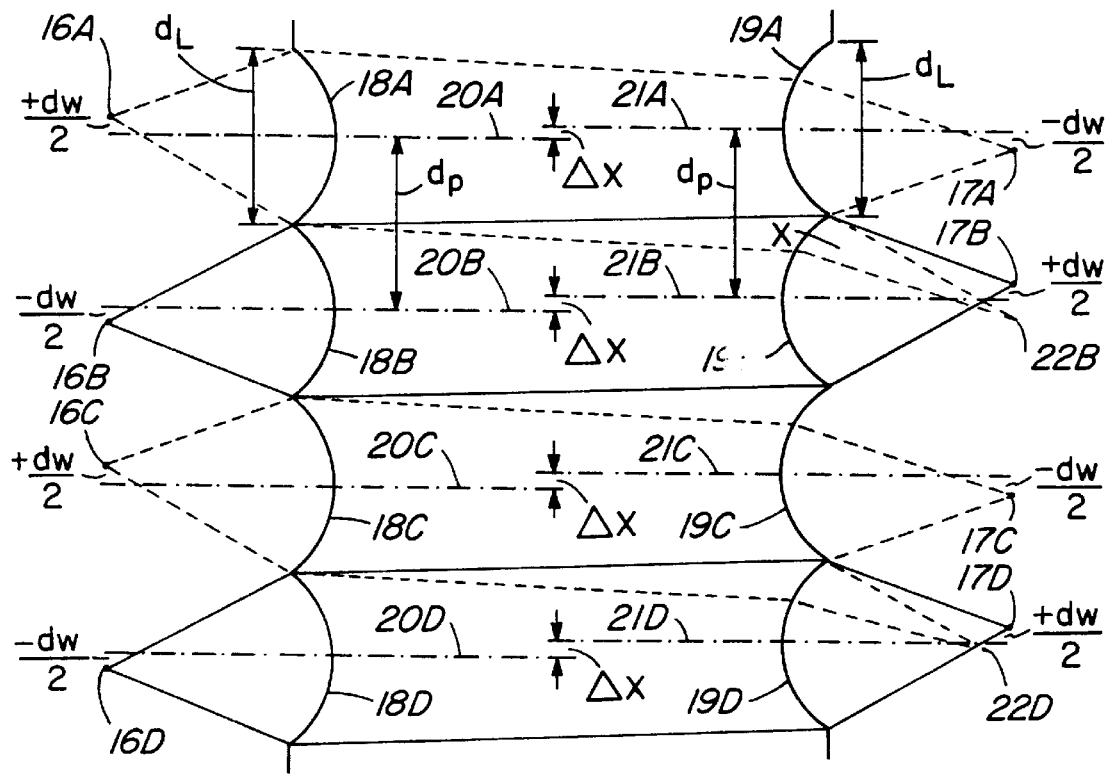
FIG. 4 corresponds to FIG. 3 but illustrates schematically the effect of translational misalignment of the lenslet arrays of the microchannel relay.
Figure 5:
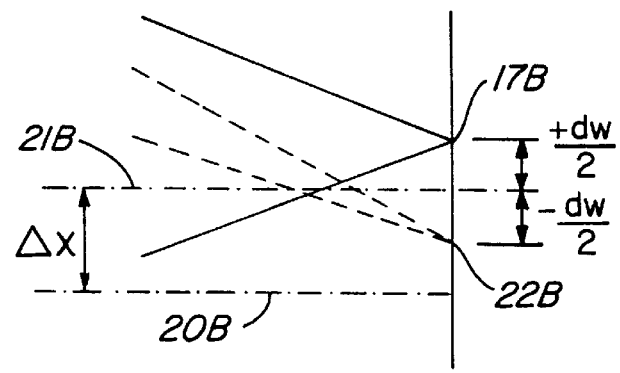
FIG. 5 is a detail view of a part of the microchannel relay of FIG. 4.

Thus, FIG. 4 shows the paths of the light beams when carrier unit 11 and lenslet unit 19 are misaligned translationally (upwards) by a distance +Δx relative to carrier unit 10 and lenslet unit 18. As a result, though most of the light leaving lenslet 18A will impinge upon lenslet 19A and be refocussed upon receiver 17A, a portion of the light leaving lenslet 18A will impinge on lenslet 19B, as indicated by reference letter X and "leak" into channel 6. However, as shown in FIG. 5, this portion X of the light beam will be refocussed at a position 22B which is offset downwards by distance –dw/2 relative to the optical axis 20B of lenslet 18B. Receiver 17B is offset upwards by distance +dw/2 relative to the optical axis 21B of lenslet 19B. The leakage light X is refocussed at a position 22B which is a distance dw from the center of the window of receiver 17B, as shown in detail in FIG. 5. The distance Δx does not affect the position of the light with respect to axis 21B—the light is focused a distance dw/2 below axis 21B. Hence, receiver 17B will not receive the refocussed light portion X from emitter 16A.

Similar considerations apply to alternate channel C. The bulk of the light from emitter 16C is received by receiver 17C, while the leakage portion leaks into channel D where it impinges upon lenslet 19D and is refocussed at 22B, missing the final receiver 17D The situation is slightly different in channels B and D because the misalignment Δx is about equal to, and in the same direction as, offsets +dw/2 of lenslets 19B/19D and receivers 17B/17D. The collimated light beams from lenslets 18B and 18D, respectively, impinge upon lenslets 19B and 19D, respectively, and there is no leakage. If the misalignment Δx were greater than offset +dw/2, a portion of light from lenslet 18B would impinge upon lenslet 19C but would be refocussed at a position Δx +dw way from receiver 17C. Consequently, there will be no significant increase in crosstalk between the channels as a result of the misalignment by Δx.

A comparison between the embodiment of the invention shown in FIG. 3 with an equivalent symmetrical on-axis microchannel relay, such as that shown in FIGS. 1 and 2, will now be made for an interconnect having the following parameters: lenslet facet pitch $d_p$=250 μm., offset $d_w$=20 μm., wavelength λ=850 nm., and lenslet focal length f=1.884 mm.

In the case of a conventional on-axis system which has the same device window size and lenslet facet pitch $d_p$=250 μm, a misalignment of Δx=50 μm will result in a signal to crosstalk ratio (SXR) of≈13 dB ($P_{sig}$:$P_{xtalk}$=39.8:1), and a misalignment of Δx=100 μm will result in a SXR of≈4.75 dB ($P_{sig}$:$P_{xtalk}$=3:1). It should be noted that a misalignment of Δx—100 μm will only reduce the throughput from about 100 per cent to about 75 per cent. Thus, with the embodiment of the invention described above, even a misalignment of 100 μm will not give rise to optical crosstalk between neighbouring channels, although the throughput of the interconnect will be similarly reduced. It may be concluded, therefore, that embodiments of the invention will be advantageous in systems requiring a robust tolerance to misalignment. Although some of the leakage light may still reach the neighbouring receiver as a result of diffraction, it is expected that this will be minimal compared to the crosstalk produced in an equivalent symmetrical microchannel relay.

In the microchannel relay shown in FIG. 3, the symmetry is "broken" by offsetting both the lenslets 19A–19D and the receivers 17A–17D, by the distance Δx. It is also possible to "break" the symmetry of the microchannel relay by offsetting adjacent ones of the lenslets in opposite directions, while keeping the sources 16A–16D and receivers 17A–17D, respectively, in register.

Figure 6:
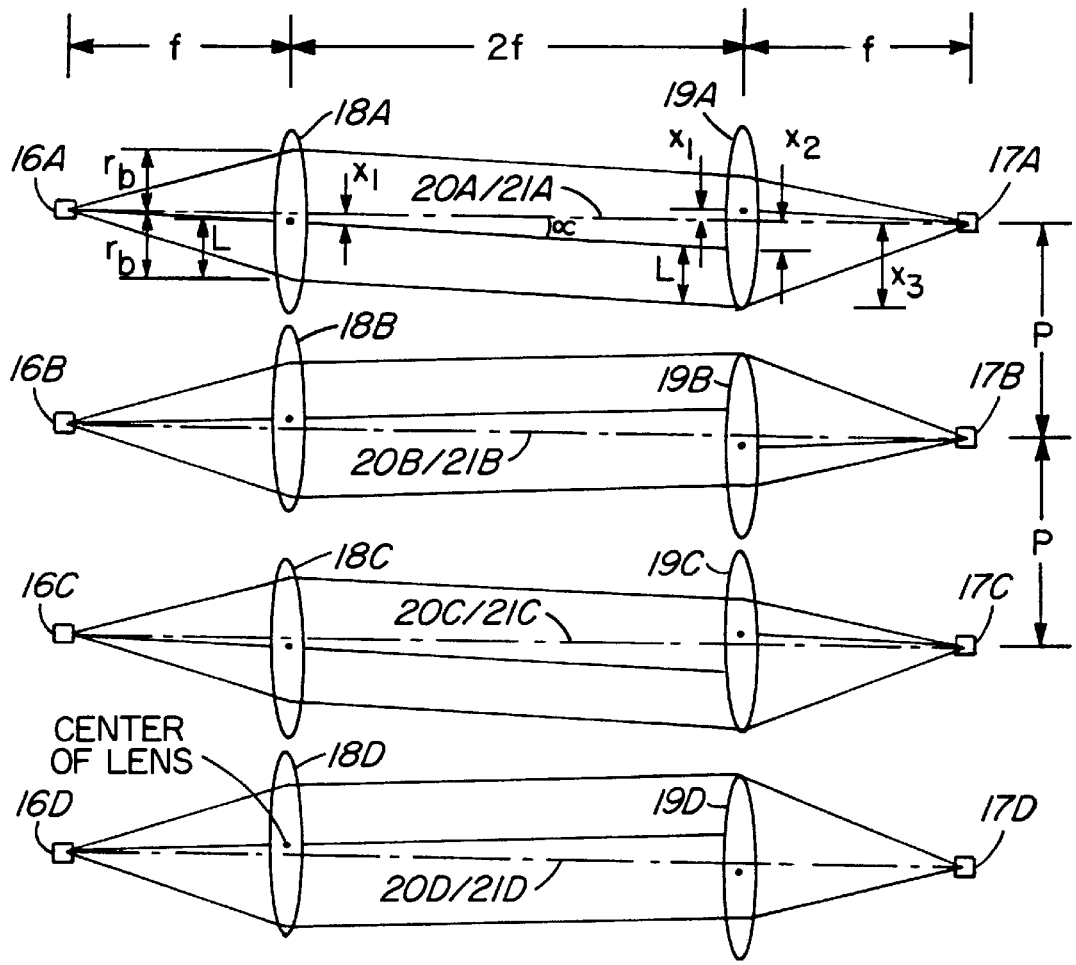
FIG. 6 is a schematic diagram of a second embodiment in which the sources and receivers are aligned and the lenslets mutually offset.

Thus, in FIG. 6 in which components have the same reference members as corresponding components in FIG. 3, each of sources 16A–16D is aligned with a corresponding one of receivers 17A–17D along a corresponding one of common axes 20A/21A–20D/21D. In channel A, lenslets 18A and 19A are offset, downwards and upwards, respectively, by distance $x_1$. In channel B, lenslets 18B and 19B are offset oppositely, i.e. upwards and downwards, respectively, by distance $x_1$. Likewise, in channel C, lenslets 18C and 19C are offset, downwards and upwards, respectively, by distance $x_1$, while in channel D, lenslets 18D and 19D are offset, upwards and downwards, respectively, by distance $x_1$. As a result, the respective axes of the collimated light beams are inclined at an angle α to the axes 20A/21A–20D/21D and, as in the earlier embodiments, light from each of the sources 16A–16D is received by the corresponding one of the receivers 17A–17D.

Figure 7:
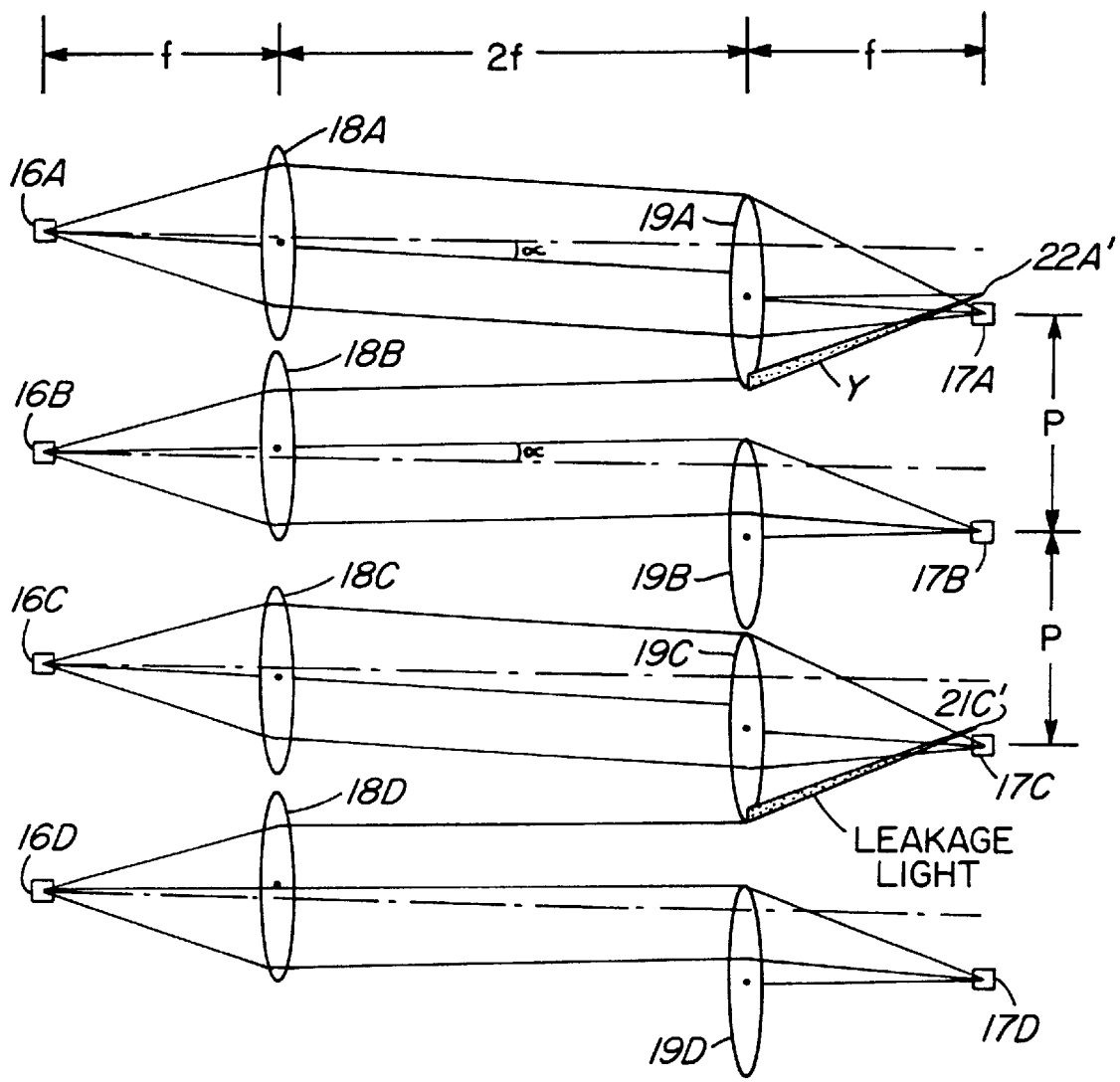
FIG. 7 illustrates the effect of misalignment of the microchannel relay of FIG. 6.

FIG. 7 illustrates the effect of misalignment of the lenslets 19A–19D and associated receivers 17A–17D relative to the sources 16A–16D and lenslets 18A–18D In this case, the former are displaced downwards relative to the latter. As before, a major portion of the light from source 16A is refocussed at receiver 17A. A portion Y of the collimated light beam misses the lenslet 19A and is lost. In channel B, a major portion of the collimated light beam is caught by lenslet 19B and is refocussed at receiver 17B while a leakage portion X impinges upon lenslet 19A and is refocussed at a position 22A' away from receiver 17A. The situation in channel C is similar to that in channel A. In channel D, a leakage portion X of the light beam from lenslet 18D impinges upon lenslet 19C, but it is refocussed at position 22C' which is away from receiver 17C.

Figure 8:
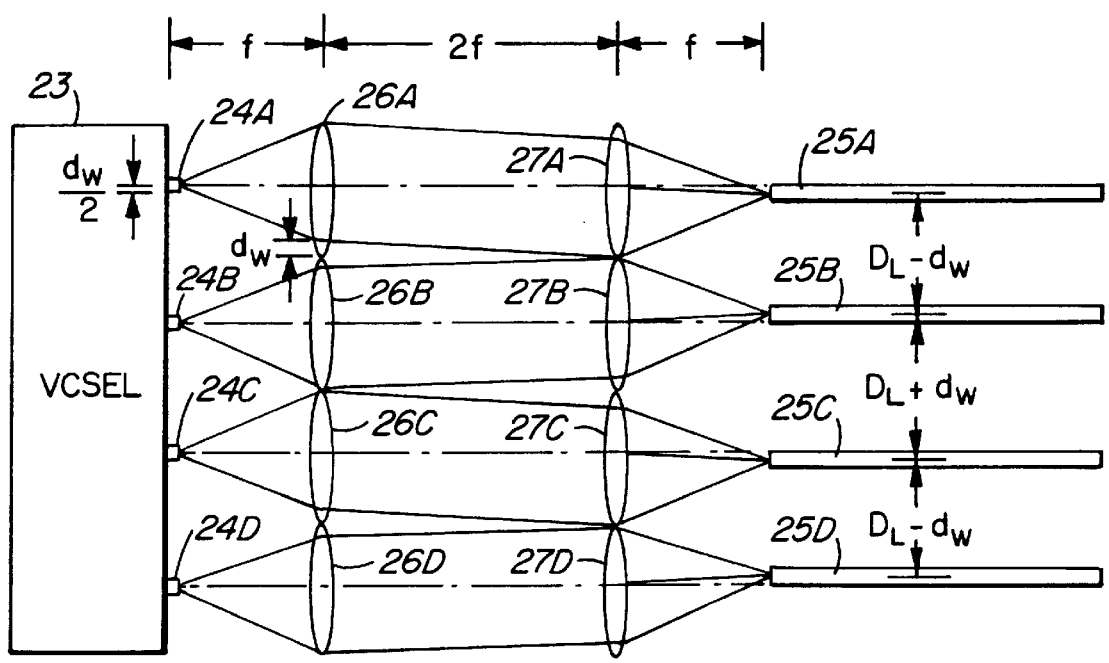
FIG. 8 is a schematic diagram of a third embodiment of the invention used for connecting a vertical cavity surface emitting laser (VCSEL) array with an optical fiber ribbon.

It should be noted that the invention is not limited to optical interconnections between integrated circuits or printed circuit boards or to the use of lasers and PIN diodes as the sources and receivers. For example, FIG. 8 illustrates an embodiment of the invention in which a vertical cavity surface emitting laser (VCSEL) 23, comprising four laser light sources 24A, 24B, 24C and 24D, is connected to a fiber ribbon comprising four optical fibers 25A, 25B, 25C and 25D. (As before, only four are shown, but there could be 1000 or more) Two arrays of lenslets 26A–26D and 27A–27D, similar to those described with reference to FIGS. 3 and 4, relay light from each of the sources 24A–24D to a corresponding one of the fibers 25A–25D. The geometry and operation of the interconnect of FIG. 8 are similar to those of the free-space interconnect of FIGS. 3 and 4.

FIG. 9 illustrates a further embodiment of the invention interconnecting two-dimensional arrays of sources and receivers. Nine sources 28A to 28I are arranged in a planar 3×3 array. A first array of nine lenslets 29A to 29I collimate light beams from the sources 28A to 28I, respectively, and a second array of nine lenslets 30A to 30I refocus the light beams onto an array of nine receivers 31A to 31I, respectively. Each of the optical axes of the lenslet array 29A–29I is coincident with the corresponding one of the optical axes of lenslet array 30A–30I. With the exception of the centre channel E, the sources and receivers in a particular channel are offset relative to each other. As illustrated in FIG. 10A, each source is offset relative to the position at which the optical axis of the associated lenslet intersects the plane of the lenslet array. For convenience, offsets upwards or to the right (in the drawings) are positive, while offsets downwards or to the left are negative. Hence, for the sources 28A–28I of FIG. 10A, the offsets are as follows:

| | | |
|---|---|---|
| +$d_w$, −$d_w$ | +$d_w$, 0 | +$d_w$, +$d_w$ |
| 0, −$d_w$ | 0, 0 | 0, +$d_w$ |
| −$d_w$, −$d_w$ | −$d_w$, 0 | −$d_w$, +$d_w$ | and, for the receivers 31A–31I, the offsets are as follows:

| $-d_w, +d_w$ | $-d_w, 0$ | $-d_w, -d_w$ |
|---|---|---|
| $0, +d_w$ | $0, 0$ | $0, -d_w$ |
| $+d_w, +d_w$ | $+d_w, 0$ | $+d_w, -d_w$ |

The effect of misalignment in any direction perpendicular to the optical axes will be analogous to the effect of misalignment upon the relay described with reference to FIGS. 3 and 4.

It will be seen that the centre source 28E and corresponding receiver 31E are not mutually offset, but they are, of course, offset relative to the corresponding sources or receivers in the neighbouring channels, so there is still a lack of symmetry.

Although only nine channels are depicted in FIG. 9, there could be many more for example 32×32.

Figure 11:
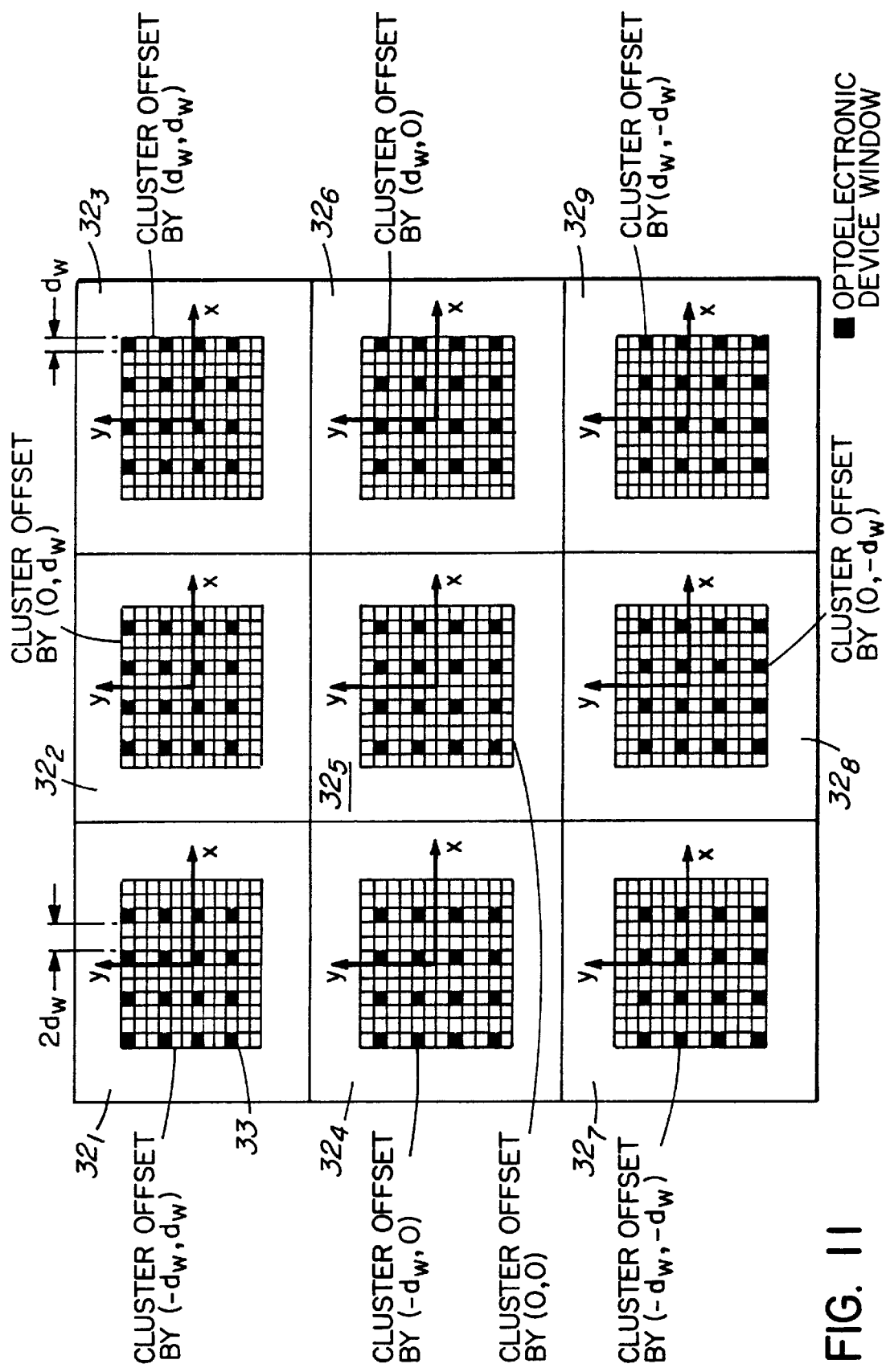
FIG. 11 illustrates clustering of several two-dimensional microchannel relays.

It is possible to employ both "broken symmetry" i.e. offsets, with so-called "clustered window" geometries and obtain simultaneously high window densities and tolerance to misalignment. Thus, FIG. 11 illustrates a microchannel relay comprising a 3×3 array of nine clusters $32_1$–$32_9$, each cluster comprising a 4×4 array of device "windows" 33, for example sources or receivers. The width of each window 33 is $d_w$ and the spacing between adjacent windows is $2d_w$. Each array of device windows 33 is offset relative to the corresponding optical axes of the adjacent lenlet unit. The lenslet unit is not shown, but will comprise a corresponding array of lenslets. of the embodiment of FIGS. 9, 10A and 10B, the offsets are $\pm d_w$ or 0, the pattern for the nine clusters $32_1$–$32_9$ being similar to that of the nine sources 28A–28D of FIG. 10A. The nine clusters of receivers will be offset in a similar manner to the receivers 31A–31I of FIG. 10B. As before there might be many more clusters in a practical array and many more devices in each cluster.

It should be appreciated that various substitutions and modifications may be made to the above-described embodiments without departing from the scope of the present invention. For example, the lenslets could be diffractive or refractive; or one-quarter pitch GRIN lenses might be substituted for the lenslets. It should also be noted that it is not necessary for all of the sources to be in one array and all of the receivers to be in the other array. One array might include a mixture of sources and receivers and the other array be complementary. Moreover, collimation of the light from the sources is not essential, though it has the advantage of allowing the spacing between the lenslet units to be relatively large. The technique is applicable to both emitter-based systems and modulator-based systems, such as multiple quantum well seed devices which modify absorption of a reflecting window to encode electrical data optically. Hence, in the context of this patent specifications, the terms "source" and "receiver" embrace such modulation devices, optical fibers, and so on.

Other approaches might be used to provide a lack of symmetry between the ends of the channels, such as an array of prisms, an offset source array and offset lenslet array. It is also envisaged that the invention could be implemented using polarization-based systems (e.g. in the case of optical couplers, orthogonal polarizations might be used to reduce crosstalk) or differing beam profiles.

Optical interconnects embodying the present invention advantageously require less precise mechanics, resulting in reduced cost. It is expected that they will be of particular benefit where connections are to be made and broken repeatedly (for example in fiber ribbon or fiber bundle connections) where the precision of the optomechanics will begin to deteriorate after many insertion cycles.

Although embodiments of the invention have been described and illustrated in detail, it is to be clearly understood that the same is by way of illustration and example only and not to be taken by way of the limitation, the spirit and scope of the present invention being limited only by the appended claims.

What is claimed is:

1. An optical interconnection arrangement comprising:
a plurality of substantially parallel optical interconnection channels each comprising a set of optical components including an optical source, an optical receiver, first lens means and second lens means, the first lens means arranged for conveying light from the source to the second lens means, and the second lens means for refocussing the light at the receiver,
wherein the components in each of said channels are configured such that an axis of a chief light ray conveyed between the first lens means and second lens means of one channel is inclined relative to an axis of a chief light ray conveyed between the first lens means and second lens means of an immediately neighbouring channel, the arrangement being such that, if a leakage portion of a light beam from a said first lens means in one channel impinges upon said second lens means in an adjacent channel, said leakage portion will be refocussed at a position spaced from the receiver of said adjacent channel.

2. An optical interconnection arrangement as claimed in claim 1, wherein, in each channel,
each source and the associated first lens means are offset one relative to the other by a predetermined distance in a direction transverse to an optical axis of said first lens means,
the corresponding receiver and the associated second lens means are offset one relative to the other by said predetermined distance oppositely to said offset of the source and first lens means, and
each offset is equal and opposite to the corresponding offset in an adjacent channel.

3. An optical interconnection arrangement as claimed in claim 2, wherein, in each channel, the first lens means and second lens means share a common optical axis and the source and receiver are offset.

4. An optical interconnection arrangement as claimed in claim 1, wherein, in each channel, the source and the receiver share a common optical axis and the first lens means and second lens means are offset.

5. An optical interconnection arrangement as claimed in claim 1, wherein the plurality of sources, plurality of receivers, plurality of first lens means and plurality of second lens means are arranged in respective two-dimensional arrays.

6. An optical interconnection arrangement as claimed in claim 5, wherein
the sources are arranged in rows and columns of a first two-dimensional rectangular array, the receivers are arranged in rows and columns of a second two-dimensional array, the first lens means are arranged in rows and columns of a third two-dimensional array and the second lens means are arranged in rows and columns of a fourth two-dimensional array,
each source or receiver not at a centre of the corresponding array is offset relative to the associated common optical axis,
each source or receiver in a column other than a central column is offset along the length of the row;
each source or receiver in a row other than a central row is offset along the length of the column.

7. An optical interconnection arrangement as claimed in claim 6, comprising a plurality of said arrays of sources arranged in a first two-dimensional matrix window, a plurality of said arrays of receivers arranged in a second two-dimensional matrix window, a plurality of said arrays of first lens means arranged in a third two-dimensional matrix window and a plurality of arrays of second lens means arranged in a fourth two-dimensional matrix window.

8. An optical interconnection arrangement as claimed in claim 1, wherein the sources comprise emitters and the receivers comprise photodetectors.

9. An optical interconnection arrangement as claimed in claim 8, wherein the emitters and photodetectors are disposed upon respective separate components.

10. An optical interconnection arrangement as claimed in claim 1, wherein some or all of the plurality of sources and the plurality of receivers comprise optical fibers.

11. An optical interconnection arrangement as claimed in claim 1, wherein some or all of the plurality of sources and the plurality of receivers comprise light modulation devices.

* * * * *

UNITED STATES PATENT AND TRADEMARK OFFICE
CERTIFICATE OF CORRECTION

PATENT NO. : 5,857,042

DATED : January 5, 1999

INVENTOR(S) : Brian Robertson, et al.

It is certified that error appears in the above-identified patent and that said Letters Patent is hereby corrected as shown below:

Column 3, line 57, change "18B" to --19B--.

Column 3, line 59, change "18B" to --17B--.

Column 4, line 46, after "the" insert --corresponding one of the--.

Column 4, line 62, change "6" to --B--.

Column 5, line 12, delete "final".

Column 5, line 12, after "17D" insert --.--.

Column 5, line 21, change "$\Delta x + dw$ way" to --$\Delta x + dw$ away--.

UNITED STATES PATENT AND TRADEMARK OFFICE
CERTIFICATE OF CORRECTION

PATENT NO. : 5,857,042

DATED : January 5, 1999

INVENTOR(S) : Brian Robertson, et al.

It is certified that error appears in the above-identified patent and that said Letters Patent is hereby corrected as shown below:

Column 5, line 26, change "with" to --and--.

Column 5, line 39, change "$\Delta x - 100\mu$" to --$\Delta x = 100\mu$--.

Column 6, line 12, after "18A-18D" insert --.--.

Signed and Sealed this

Thirtieth Day of March, 1999

Q. TODD DICKINSON

*Attest:*

*Attesting Officer*  *Acting Commissioner of Patents and Trademarks*